United States Patent [19]

Yamagata et al.

[11] 4,428,227

[45] Jan. 31, 1984

[54] INTAKE PIPE PRESSURE INDICATING SYSTEM FOR AN INTERNAL COMBUSTION ENGINE OF A VEHICLE

[75] Inventors: Tetsuo Yamagata, Tokyo; Morio Sato, Yokohama; Tetsuo Ogishima, Shiki; Yoji Matsuyama, Higashiyamato, all of Japan

[73] Assignee: Honda Giken Kogyo Kabushiki Kaisha, Tokyo, Japan

[21] Appl. No.: 379,750

[22] Filed: May 19, 1982

[30] Foreign Application Priority Data

May 19, 1981 [JP] Japan .................................. 56-76289

[51] Int. Cl.³ .......................................... G01M 15/00
[52] U.S. Cl. ..................................................... 73/115
[58] Field of Search .................. 73/115, 118; 123/559; 415/118; 340/60

[56] References Cited

U.S. PATENT DOCUMENTS 4,046,003  9/1977  Armstrong et al. .................. 73/118
4,334,427  6/1982  Armstrong ............................ 73/118

*Primary Examiner*—Jerry W. Myracle
*Attorney, Agent, or Firm*—Irving M. Weiner; Pamela S. Burt; John L. Shortley

[57] ABSTRACT

An intake pipe pressure indicating system for an internal combustion engine of a vehicle having an intake pipe including a supercharger and a throttle valve. The system comprises sensors which detect the internal pressure of the intake pipe at an upstream position and at a downstream position, respectively, with respect to the throttle valve and provides corresponding output signals. A comparator provides a logic signal based on the result of a comparison between the output signal from either of the sensors and a reference value. A selection circuit is provided which is adapted to select and to transmit and output either of the output signals on the basis of the logic signal, and a single indicator is provided which is adapted to provide an indication corresponding to the output signal of the selection circuit. The respective intake pipe pressures at the upstream position and at the downstream position with respect to the throttle valve can be selectively indicated by a single indicator in a continuous manner so that the indicator is used effectively.

13 Claims, 6 Drawing Figures

INTAKE PIPE PRESSURE INDICATING SYSTEM FOR AN INTERNAL COMBUSTION ENGINE OF A VEHICLE

BACKGROUND OF THE INVENTION

1. Field of the Invention

The present invention relates generally to an intake pipe pressure indicating system for an internal combustion engine of a vehicle. More particularly, the invention relates to an intake pipe pressure indicating system for an internal combustion engine of a vehicle provided with a supercharger.

2. Description of Relevant Art

It has been known to provide an indicating system for vehicles having an internal combustion engine provided with a supercharger, such as a motorcycle provided with a turbo-supercharger, in order to indicate an operating state of the supercharger. Generally, the operating state of the supercharger is represented by a pressure within an intake pipe (hereinafter referred to as "intake pipe pressure") between the supercharger and a throttle valve disposed downstream thereof. Where the indicating system has a voltmeter or the like employed as an indicator for indicating the intake pipe pressure, the indicating pointer thereof will not move during the idling state of the engine in which no supercharge is effected and the indicator is fed with pressure signals which are too faint, thus causing a problem inasmuch as when the supercharge starts, the indicator abruptly indicates supercharged pressures.

The present invention effectively overcomes such problem attendant the conventional intake pipe pressure indicating systems for an internal combustion engine of a vehicle.

SUMMARY OF THE INVENTION

The present invention provides an intake pipe pressure indicating system for an internal combustion engine of a vehicle including an intake pipe having a supercharger and a throttle valve disposed downstream of the supercharger. The indicating system comprises a first sensor for detecting an internal pressure of the intake pipe downstream of the supercharger and upstream of the throttle valve and providing a first signal according thereto, a second sensor for detecting an internal pressure of the intake pipe downstream of the throttle valve and providing a second signal according thereto, a comparator for providing a logic signal based on a comparison between at least either of the first and second signals and a predetermined reference value, a selection circuit for selecting either the first or second signal on the basis of the logic signal and providing an indication signal according thereto, and a single indicator adapted to receive the indication signal to thereby provide an indication according to the indication signal.

It is an object of the present invention to provide an intake pipe pressure indicating system for an internal combustion engine of a vehicle provided with a supercharger, wherein intake pipe pressures upstream and downstream of a throttle valve disposed downstream of the supercharger can be continuously indicated with a signal indicator, so that the intake pipe pressure is indicated by means of the single indicator while ranging from the idling to the supercharged state of the engine.

Another object of the present invention is to provide an intake pipe pressure indicating system for an internal combustion engine of a vehicle including a supercharger which, in addition to attaining the foregoing object, also provides an automatic and continuous indication of the intake pipe pressure downstream of the throttle valve while the engine is idling and upstream thereof while the engine is heavily loaded, by means of a single indicator. In this manner, visual recognition of the indication is facilitated when driving, while the vehicle space consumed by the system as well as the cost of the system is effectively reduced.

A further object of the present invention is to provide an intake pipe pressure indicating system for an internal combustion engine of a vehicle, which has an indicator adapted to provide a visually comprehensible indication of the level of the intake pipe pressure when driving, while permitting a ready and instantaneous visual confirmation of the intake pipe pressure in combination with other parameters, such as the speed of travel of the vehicle, so as to thus represent the travel state of the vehicle and reduce mental fatigue on the part of the driver.

The above and further objects, features and advantages of the present invention will become apparent from the following detailed description of preferred embodiments of the invention when read in conjunction with the accompanying drawings.

DETAILED DESCRIPTION OF PREFERRED EMBODIMENTS

Figure 1:
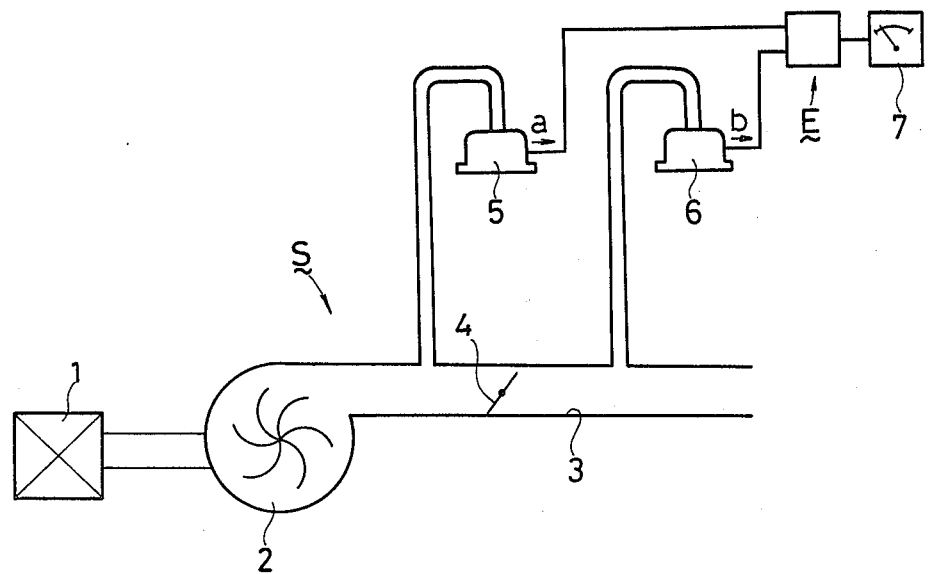
FIG. 1 is a schematic illustration of an intake pipe system of an internal combustion engine of a vehicle provided with an intake pipe pressure indicating system according to a first embodiment of the present invention.

With reference to FIG. 1, symbol S generally designates an intake system of an internal combustion engine of a vehicle. The intake system S, as known, comprises an air cleaner 1, a compressor 2, an intake pipe 3 and a throttle valve 4. The air taken in through a suction inlet (not shown) is supplied to a cylinder (not shown) of the internal combustion engine through the intake pipe 3 including the throttle valve 4 after being compressed by the compressor 2. A sensor 5 which detects the pressure of air compressed by the compressor 2 (supercharging pressure) is disposed upstream of the throttle valve 4, while a sensor 6 detecting actual supply pressures to the engine, i.e., the boost pressure, provided by reducing the supercharging pressure with the throttle valve 4, is disposed downstream of the throttle valve 4.

The sensors 5 and 6 detect internal pressures within the intake pipe 3 in respective portions thereof in which the sensors 5 and 6 are disposed. The detected internal pressures are converted into electric signals a and b, respectively, and the electric signals a and b are applied to a fuel injector (not shown) of the engine to control the operation of the fuel injector, and are selectively applied through an electric circuit E to a single pressure indicator 7 comprising a voltmeter or the like which indicates the corresponding detected pressure.

Figure 3:
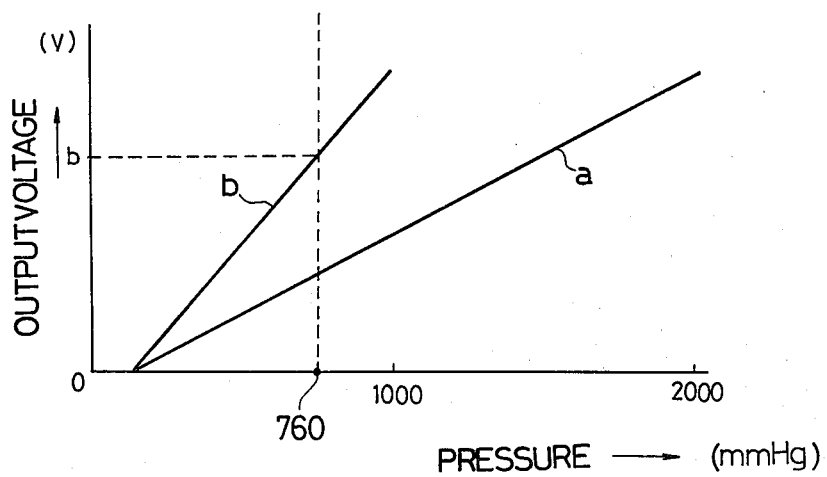
FIG. 3 is an explanatory diagram relating to the output characteristics of pressure sensors of the intake pipe pressure indicating system of FIG. 1.

FIG. 3 shows output characteristics of the sensors 5 and 6, in which changes in the respective output voltage signals a and b with those in the intake pipe pressure are shown for the sensors 5 and 6. As shown, the output signal a of the sensor 5 changes substantially linearly with the absolute pressure at a comparatively small gradient, while the output signal b of the sensor 6, which signal b is simultaneously used as an input to control the engine, changes substantially linearly at a comparatively large gradient. It will be understood, however, that the sensors 5, 6 are not limited to such particular characteristics, and may be designed as desired.

Figure 2:
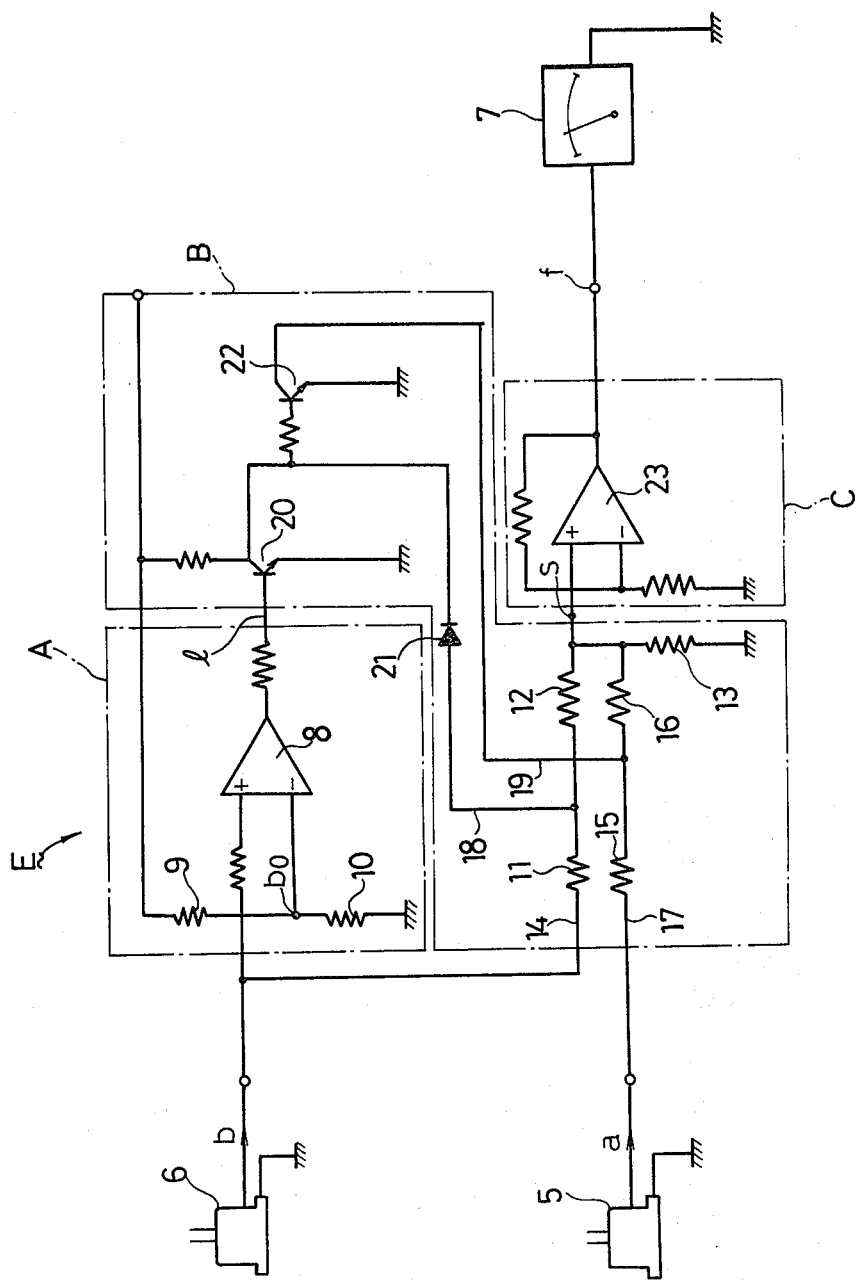
FIG. 2 is a circuit diagram of the intake pipe pressure indicating system of FIG. 1.

Referring now to FIG. 2, the electric circuit E for selectively transmitting either the output signal a of the sensor 5 or the output signal b of the sensor 6, comprises a comparator A adapted to compare the actual output signal b of the sensor 6 with an internal reference voltage signal bo of the same magnitude as an output voltage of the sensor 6 corresponding substantially to atmospheric pressure. Electric circuit E further comprises a selection circuit B which selectively decides which signal, i.e., either the output signal a or b, is to be transmitted to be output as a signal S to the indicator 7 on the basis of a logic signal l provided by the comparator A. Also provided is an amplifier circuit C adapted to convert the output signal S of the selection circuit into a final signal f and apply the final signal f to the indicator 7.

The comparator A includes an operation amplifier 8 and resistances 9 and 10 forming a potentiometer for setting the reference voltage bo. The reference voltage bo and the output signal b of the sensor 6 are applied to the negative terminal (−) and the positive terminal (+), respectively, of the operation amplifier 8 to provide the logic signal l. The selection circuit B comprises a circuit 14 for transmitting the output signal b, including resistances 11 and 12 connected in series and grounded through a resistance 13, and a circuit 17 for transmitting the output signal a, including resistances 15 and 16 connected in series and also grounded through the resistance 13. The circuits 14 and 17 have grounding circuits 18 and 19, respectively, connected between the resistances 11 and 12 and between the resistances 15 and 16, respectively, for shunting energy. Each of the grounding circuits 18 and 19 has the switching function thereof actuated on the basis of the logic signal l. The terminal voltage of the resistance 13 is then output as the output signal S.

In the above-described arrangement, the output signals a and b as transmitted through the selection circuit B are adequately divided by the resistances 13, 16 and 12, 13, respectively, so as to cancel the difference in the output characteristics of the sensors 5 and 6.

The grounding circuit 18 includes an emitter-grounded npn transistor 20 which is adapted to receive the logic signal l at the base thereof and to function as a switching element, and a diode 21 connected to the collector of the transistor 20 and to a line connecting the resistances 11 and 12. The grounding circuit 19 includes an emitter-grounded npn transistor 22 as a switching element, the base of which is connected to the collector of the transistor 20 while the collector of transistor 22 is connected to a line connecting the resistances 15 and 16.

The amplifier circuit C comprises an amplifier 23 which amplifies the signal S applied to the positive terminal (+) thereof and provides a final signal f.

A terminal 15 is connected to an external power source (not shown). A steady DC voltage is applied to the terminal 15.

When the output signal b is lower than the set reference voltage bo, the output signal l of the differential amplifier 8 is at a low level so that the transistor 20 is switched off and the transistor 22 is switched on. Consequently, the electrical energy of the output signal a of the sensor 5 is shunted and grounded through the transistor 22, whereas the output signal b of the sensor 6 is amplified by the amplifier 23 and indicated by the indicator 7. When the level of the output signal b of the sensor 6 is higher than the reference voltage bo, the output signal l of the differential amplifier 8 is at a high level so that the transistor 20 is switched on and the transistor 22 is switched off. Consequently, the electrical energy of the output signal b of the sensor 6 is shunted and grounded through the transistor 20, whereas the output signal a of the sensor 5 is amplified by the amplifier 23 and indicated by the indicator 7.

It will be apparent from the foregoing description that the operating state of the engine, i.e., idling operation as opposed to high-load operation, is discriminated through comparison between the reference voltage bo, which is set by the resistances 9 and 10, and the output signal b of the sensor 6. When the engine is in an idling condition, the actual boost pressure is indicated by the indicator 7 on the basis of the output signal b of the sensor 6, whereas when the engine is in a high-load condition, the supercharging pressure is indicated by the indicator 7 on the basis of the output signal a of the sensor 5. Accordingly, the single indicator 7 can be used effectively for indicating the intake pipe pressure in the overall operating range of the engine, i.e., from idling operation through high-load operation, because the indicator 7, which otherwise has been adapted to indicate the supercharging pressure, can now also indicate the boost pressure when the engine is in an idling condition. Further, although the electrical energy shunting circuits 18, 19 are controlled on the basis of the results of the comparison between the output signal b of the sensor 6 and the reference voltage bo in this embodiment, the electrical energy shunting circuits may alternatively be adapted to be controlled on the basis of the result of a comparison between the output signal a of the sensor 5 and another predetermined reference voltage. Still further, the indicator 7 is not limited to only a voltmeter, but may alternatively comprise another known indicator, such as an ammeter or a digital indicator, for example.

Figure 4:
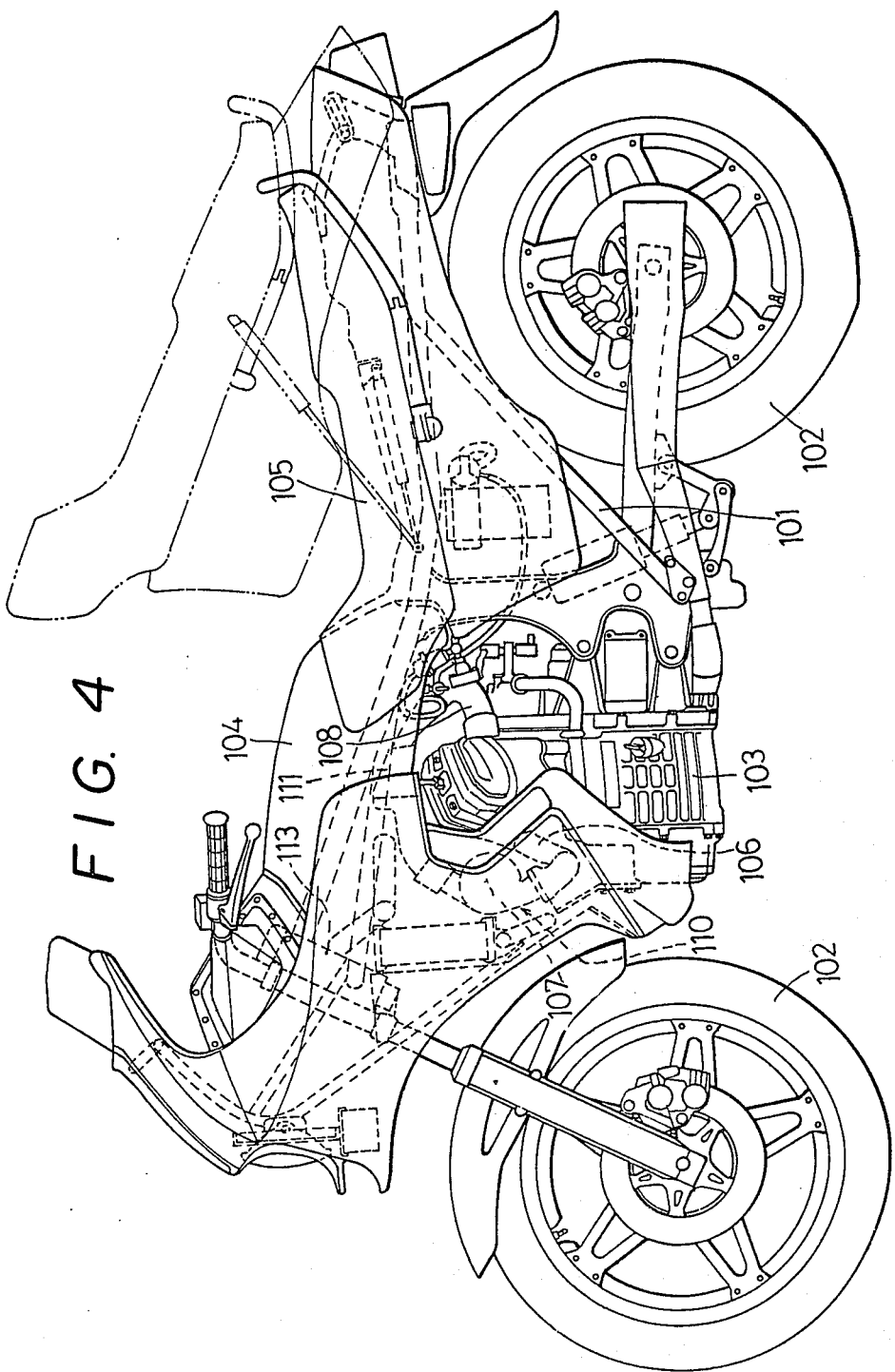
FIG. 4 is a side view of a motorcycle provided with an intake pipe pressure indicating system for an internal combustion engine according to a second embodiment of the present invention.
Figure 5:
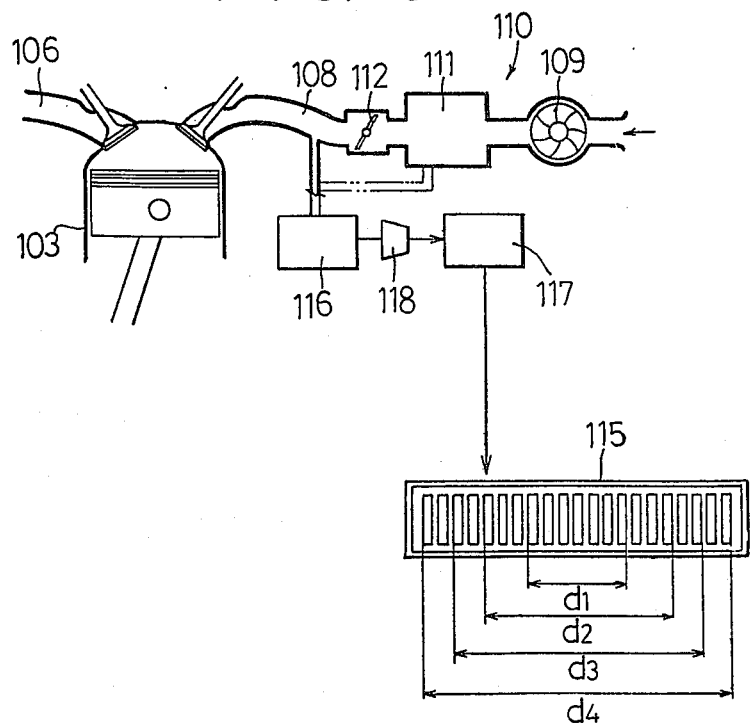
FIG. 5 is a block diagram schematically showing the intake pipe pressure indicating system of FIG. 4.
Figure 6:
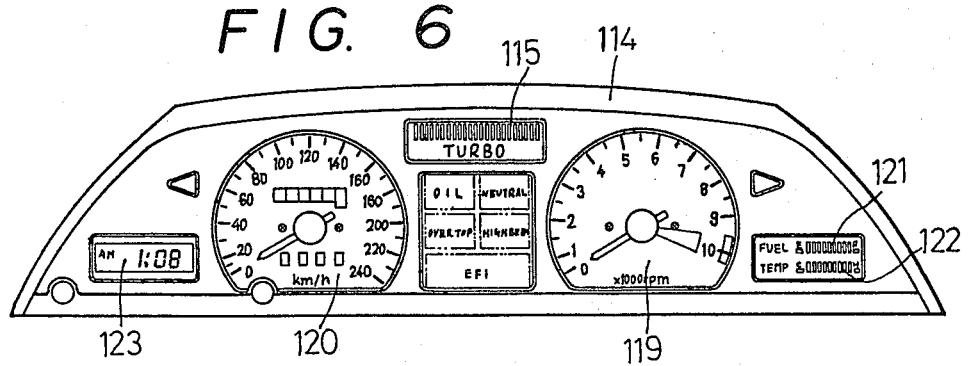
FIG. 6 is an enlarged front view of an indicator of the intake pipe pressure indicating system of FIG. 4.

Referring now to FIGS. 4 through 6 which illustrate a second embodiment of the invention, a motorcycle is shown as generally comprising a frame 101 provided with front and rear wheels 102, an engine 103 disposed at an intermediate portion of the frame, a fuel tank 104 disposed over the engine 103, and a driver's seat 105 disposed behind the fuel tank 104. The engine 103 is provided with a turbo-supercharger 110 comprising an exhaust turbine 107 disposed in the exhaust pipe 106 and a compressor 109 disposed in the intake pipe 108. Provided in the intake pipe 108 is a prechamber 111 after the compressor 109 and a throttle valve 112 after the prechamber 111.

An instrument panel 114 as shown in FIG. 6 is attached to the rear side of the head pipe connected to the front part of the frame 101. A bar graph type indicator 115 extending laterally of the instrument panel 114 is disposed at substantially the central part of the instrument panel 114. A pressure sensor 116 is disposed on one side of the intake pipe 108 at a downstream position with respect to the compressor 109 for detecting the intake pipe pressure. An output signal of the pressure sensor 116 is transmitted to the indicator 115 through an electronic controller 117 and indicated by the indicator 115 in a stepped pattern which extends in steps from the central part of the indicator 115 toward the opposite ends of the indicator 115 in a band expansion manner corresponding to the increase of the intake pipe pressure. A low-pass filter 118 is connected to the output side of the pressure sensor 116. The indicator 115 may be of a liquid crystal type, light emission diode type or discharge tube type. The width of the bright strip-shaped indicating pattern increases gradually with the increase of the intake pipe pressure from a width $d_1$ as a negative intake pressure zone, through a width $d_2$ as a moderate intake pressure zone to a width $d_3$ as a high intake pressure zone. A width $d_4$ indicates the "red" or warning zone.

The instrument panel 114 is designed to have substantially a trapezoidal shape and is tilted substantially forwardly. The indicator 115 is disposed at the upper part of the central portion of the instrument panel 114. A tachometer 119 and a speedometer 120 are disposed adjacent to the indicator 115 on the respective sides thereof. Also provided is a fuel gauge 121, a temperature gauge 122 and a clock 123, respectively.

In the above-described second embodiment, only a single pressure sensor 116 is shown for ease of explanation. However, it will be understood that another pressure sensor may be provided at an upstream position with respect to the throttle valve 112 as is the case in the first embodiment. The system may then be arranged so as to selectively indicate the respective output signals of the two pressure sensors in a continuous manner by the indicator 115 corresponding to the operating condition of the engine, i.e., idling operation or high-load operation, after processing the output signals of such pressure sensors through the electronic controller 117.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In an internal combustion engine of a vehicle including an intake pipe provided with a supercharger and a throttle valve disposed downstream of said supercharger, an intake pipe pressure indicating system, comprising:
    a first sensor which detects an internal pressure of said intake pipe downstream of said supercharger and upstream of said throttle valve and provides a first signal according thereto;
    a second sensor which detects an internal pressure of said intake pipe downstream of said throttle valve and provides a second signal according thereto;
    a comparator operatively connected with said first and second sensors and providing a logic signal on the basis of a comparison between at least either of said first and second signals and a predetermined reference value;
    a selection circuit operatively connected with said comparator and selecting either said first or said second signal on the basis of said logic signal and providing an indication signal according thereto; and
    a single indicator operatively connected with said selection circuit and adapted to receive said indication signal and effect an indication according to said indication signal.

2. An intake pipe pressure indicating system according to claim 1, wherein:
    said selection circuit comprises:
        an output circuit which provides said indication signal;
        a first transmission circuit which transmits said first signal to said output circuit;
        a first switching circuit which is connected to said first transmission circuit at one end thereof and is substantially grounded at the other end thereof;
        a second transmission circuit which transmits said second signal to said output circuit;
        a second switching circuit which is connected to said second transmission circuit at one end thereof and is substantially grounded at the other end thereof; and
        said first and second switching circuits being adapted to be switched on and switched off on the basis of said logic signal.

3. An intake pipe pressure indicating system according to claim 2, wherein:
    said first and second switching circuits comprise first and second emitter-grounded transistors, respectively.

4. An intake pipe pressure indicating system according to claim 3, wherein:
    the collector of said first transistor is connected to said first transmission circuit;
    the collector of said second transistor is connected to both said second transmission circuit and the base of said first transistor; and
    said logic signal is applied to the base of said second transistor.

5. An intake pipe pressure indicating system according to claim 1, wherein:
    said comparator comprises an operation amplifier.

6. An intake pipe pressure indicating system according to claim 5, wherein:
    said operation amplifier includes a positive input terminal having said first signal applied thereto, a negative terminal having said reference value applied thereto, and an output terminal through which said logic signal is provided.

7. An intake pipe pressure indicating system according to claim 6, wherein:
    said reference value is substantially the same as a value of said first signal when said internal pressure of said intake pipe upstream of said throttle valve is equal to the atmospheric pressure.

8. An intake pipe pressure indicating system according to claim 1, wherein:

said indicator comprises an amplifier which amplifies said indication signal and provides an output, and a voltmeter adapted to make an indication according to said output of said amplifier.

9. An intake pipe pressure indicating system according to claim 1, wherein:
said indicator provides a visual display which is variable in a band-expansion manner in accordance with the variation of said indication signal.

10. An intake pipe pressure indicating system according to claim 9, wherein:
said visual display is provided in the form of a plurality of bars arranged side-by-side substantially horizontally.

11. An intake pipe pressure indicating system according to claim 9, wherein:
said indicator is disposed adjacent to a tachometer of said vehicle.

12. An intake pipe pressure indicating system according to claim 1, wherein:
said vehicle comprises a motorcycle provided with a turbo-supercharger comprising an exhaust gas turbine disposed within an exhaust pipe of said internal combustion engine and said supercharger.

13. An intake pipe pressure indicating system according to claim 1, wherein:
said indication as based on said first signal and said indication as based on said second signal are continuous with each other.

* * * * *